United States Patent [19]

Friedes et al.

[11] Patent Number: 5,311,572
[45] Date of Patent: May 10, 1994

[54] COOPERATIVE DATABASES CALL PROCESSING SYSTEM

[75] Inventors: Albert Friedes, East Brunswick; Om P. Mahajan, Ocean, both of N.J.

[73] Assignee: AT&T Bell Laboratories, Murray Hill, N.J.

[21] Appl. No.: 770,268

[22] Filed: Oct. 3, 1991

[51] Int. Cl.$^5$ .......................... H04M 1/64; H04M 3/42
[52] U.S. Cl. ........................... 379/67; 379/88;
379/89; 379/201; 379/207; 379/220; 379/230; 379/242; 379/211
[58] Field of Search ..................... 379/88, 89, 67, 242, 379/230, 220, 201, 207, 127

[56] References Cited

U.S. PATENT DOCUMENTS

| | | | |
|---|---|---|---|
| 4,191,860 | 3/1980 | Weber | 179/18 |
| 4,611,094 | 9/1986 | Asmuth et al. | 179/7.1 |
| 4,737,983 | 4/1988 | Frauenthal et al. | 379/221 |
| 4,757,267 | 7/1988 | Riskin | 379/113 |
| 4,788,718 | 11/1988 | McNabb et al. | 379/134 |
| 4,987,587 | 1/1991 | Jolissaint | 379/94 |
| 5,136,636 | 8/1992 | Wegrzynowicz | 379/207 |

OTHER PUBLICATIONS

Engineering and Operations in the Bell System, Second Ed., 1982–1983, pp. 292–294, AT&T Bell Laboratories.
The Bell System Technical Journal, vol. 61, No. 7, Sep. 1982, "800 Service Using SPC Network Capability", Sheinbein et al., pp. 1737–1744.

*Primary Examiner*—James L. Dwyer
*Assistant Examiner*—Fan Tsang
*Attorney, Agent, or Firm*—Barry H. Freeman

[57] ABSTRACT

A system for processing a database-queried call uses the call processing capabilities of a carrier's database and a subscriber's database as part of a total communication switching system. Generally, origination information such as as ANI, dialed number and caller entered information are forwarded by the originating switch to the carrier's database which sends them to the subscriber's database. The latter uses prestored programs and callers' related information to formulate a processing label for the call. The processing label is comprised of i) a routing label which provides input to the carrier's database to select a destination number for the call ii) an end point label which includes information to be passed to the subscriber's premise equipment and iii) a billing information label which can be used by the originating switch to create a customized billing record for the call. If desired, the subscriber's database, upon finding that the received call origination information is insufficient to positively identify a caller, can request additional information from the caller. This allows the communication switching system to provide call-by call routing features to subscribers without subjecting all callers to post-dial delay inconveniences caused by an ordinary prompting arrangement. In order to update a file of call handling resources available at all subscriber's locations, the carrier's database can send the selected destination number after the call has been completed to the subscriber's database.

46 Claims, 12 Drawing Sheets

FIG. 2

| CARRIER'S DATABASE CPR PARTIAL RECORD LAYOUT ||||||
|---|---|---|---|---|---|
| SUBSCRIBER RECORD ID | INTELLIGENT CALL PROCESSING ROUTE-SELECT | CALL PROMPTER | QUERY CAPABILITY SWITCH | CINFO | VARIABLE BILLING |
| 201 | 202 | 203 | 204 | 205 | 206 |

FIG. 3

SUBSCRIBER'S DATABASE
CALLER CLASS ROUTING AND CUSTOMER PROCESSING RECORD PARTIAL REPRESENTATION
(CCRCPR)

| AUTOMATIC NUMBER IDENTIFICATION | DIALED NUMBER | CUSTOMER RECORD IDENTIFICATION | FINANCIAL INFORMATION | POTENTIAL BUSINESS RATING | ACCOUNT INFORMATION | APPLICATION SPECIFIC DATA | BILLING RATE |
|---|---|---|---|---|---|---|---|
| 301 | 302 | 303 | 304 | 305 | 306 | 307 | 308 |

FIG. 8

PROCESSING LABEL TABLE I

| CHARACTERISTICS | | LOCATIONS | EXTENSION CODE |
|---|---|---|---|
| POLICY FACE VALUE | TYPE OF POLICY | | |
| $ 1 MILLION + | LIFE | ABCD | 1 |
| $ 1 MILLION + | PROPERTY | EFGH | 1 |
| $1/2 MILLION < FACE VALUE < $1 MILLION | LIFE | BDEF | 2 |
| $1/2 MILLION < FACE VALUE < $1 MILLION | PROPERTY | GHIJ | 2 |
| OTHER | - | ABCDEFGHIJ | 3 |

FIG. 9

PROCESSING LABEL TABLE II

| CHARACTERISTICS | | SERVICE TYPE INDICATOR |
|---|---|---|
| POLICY FACE VALUE | TPYE OF POLICY | |
| $ 1 MILLION | LIFE | L1 |
| $ 1 MILLION | PROPERTY | L2 |
| $1/2 MILLION < FACE VALUE < $1 MILLION | LIFE | L3 |
| $1/2 MILLION < FACE VALUE < $1 MILLION | PROPERTY | L4 |
| $ OTHER | - | L5 |

FIG. 10

PROCESSING LABEL RECORD I

| ROUTING LABEL | END POINT LABEL 1 | END POINT LABEL 2 | BILLING INFORMATION LABEL |
|---|---|---|---|
| 1001 | 1002 | 1003 | 1004 |

FIG. 11

ROUTING OPTIONS TABLE

| POLICY NUMBER | ALTERNATIVE LOCATIONS |
|---|---|
| 23456 | BDFH |
| 32109 | ACEG |
| ○ | ○ |
| ○ | ○ |
| ○ | ○ |
| ○ | ○ |
| ○ | ○ |
| 99999 | CEIJ |

FIG. 12

CARRIER'S DATABASE INITIAL PROCESSING TABLE

| | ROUTING LOGIC TREE INDICATOR | LOCATIONS/TREATMENT | EXTENSION CODE |
|---|---|---|---|
| 1210 | L1 | ABCD | 1 |
| 1220 | L2 | EFGH | 1 |
| 1230 | L3 | BDEF | 2 |
| 1240 | L4 | GHIJ | 2 |
| 1250 | L5 | A,B,C,D,E,F,G,H,I,J | 3 |

FIG. 13

LOCATION A – CPE ROUTING TABLE

| EPL1 | EXTENSIONS |
|---|---|
| 1 | 2345,2456 |
| 2 | 2567,2678 |
| 3 | ANY EXTENSION EXCEPT 2345,2456,2567,2678 |

PROCESSING LABEL RECORD II

| SERVICE TYPE LABEL | END POINT LABEL | BILLING INFORMATION LABEL |
|---|---|---|
| 1401 | 1402 | 1403 |

FIG. 15

| STORAGE AREA MAP FOR CARRIER'S DATABASE INSTRUCTIONS |
|---|
| RECEPTION OF CALL ORIGINATION INFORMATION — 1501 |
| RETRIEVAL OF INITIAL CALL PROCESSING INFORMATION — 1502 |
| TRANSMISSION OF CALL ORIGINATION INFORMATION — 1503 |
| DETERMINATION OF CALL TREATMENT — 1504 |
| TRANSMISSION OF DESTINATION NUMBER — 1505 |
| RECEPTION OF PROCESSING LABEL — 1506 |
| TRANSMISSION OF PART OF PROCESSING LABEL — 1507 |
| TERMINATION OF COMMUNICATION WITH SUBSCRIBERS'S DATABASE — 1508 |
| MONITORING OF TIME BETWEEN TASKS — 1509 |
| DETERMINATION OF OPERATIONAL STATUS OF SUBSCRIBER'S DATABASE — 1510 |

FIG. 16

| STORAGE AREA MAP FOR SUBSCRIBER'S DATABASE INSTRUCTIONS |
|---|
| RECEPTION OF CALLL ORIGINATION INFORMATION — 1601 |
| RETRIEVAL OF CALLER'S RELATED INFORMATION — 1602 |
| ACTION FOR FORMULATION OF PROCESSING LABEL — 1603 |
| DECISION FOR FORMULATION OF PROCESSING LABEL — 1604 |
| TRANSMISSION OF PROCESSING LABEL INFORMATION — 1605 |
| RECEPTION OF DESTINATION NUMBER AFTER CALL COMPLETION — 1606 |
| SOLICITATION OF ADDITIONAL INFORMATION REGARDING CALLER — 1607 |

COOPERATIVE DATABASES CALL PROCESSING SYSTEM

TECHNICAL FIELD

This invention relates to a system and method for processing database-queried telephone calls, and more particularly, to a system and method enabling such calls to be completed through the cooperative generation and processing of routing and handling instructions by a subscriber's database system and a carrier's routing database as part of a total communication switching system.

BACKGROUND OF THE INVENTION

Database queried communications services, such as 800 and 900 services which require information look-up in order to route each call, have become increasingly critical for day-to-day operations of a large number of telephone subscribers. As the vital pipeline to a vast pool of callers, telephone calls made to subscribers of these services represent potential business opportunities and therefore need to be routed, completed and handled by telecommunications carriers and subscribers of these services represent potential business opportunities and therefore need to be routed, completed and handled by telecommunications carriers and subscribers alike, in the most efficient manner. To that end, communications carriers have enhanced these services by offering two major optional features, namely, 1) "advanced routing", which aims to enable subscribers to get optimal performance from their call handling resources and 2) "calling party identification" which purports to give subscribers some background information regarding the caller.

The advanced routing features are implemented as part of a plurality of inventions that have sprung out of the teachings of R. P. Weber in U.S. Pat. No. 4,191,860. Weber's patent described a technique for translating an 800 number to a Plain Old Telephone Service (POTS) number in a routing database using the dialed number and the Numbering Plan Area (NPA) of the caller as routing parameters. New advanced routing features introduced by communications carriers allow subscribers to select from a broader class of routing parameters. Selection of these parameters however, is still limited to a restricted set. For example, in U.S. Pat. No. 4,611,094, Asmuth et al. disclosed a method for routing calls based on additional information received from the caller through a call prompting device and other carrier defined routing parameters, such as time of day, day of the week, time zone at subscriber's locations or calling station, etc. While subscribers can periodically change the value of these carrier defined parameters or send congestion status information to the carrier's database via dedicated lines, as disclosed in U.S. Pat. No. 4,737,983, carriers, however, have been reluctant to allow external parameters other than congestion status information to influence routing decisions on a call by call basis, because of heightened security concerns raised by the interaction between subscriber's databases and carrier's routing databases. As a result, subscribers are forced to choose exclusively from carrier's defined parameters that may be ill-suited for their business needs. For example, a bank with its operations confined to one time zone would likely prefer to have routing decisions for calls originating from its depositors or debtors predicated on their account number or loan number, in addition to traditional routing parameters (such as time of day, day of week etc). However, meeting the requirements of this bank and each of a carrier's numerous subscribers wishing to customize routing decisions to their particular business environment will necessitate a prohibitively costly expansion of the carrier's routing database. In addition, carriers are legitimately concerned about the potential degradation in performance in terms of call setup time delay that could arise from the increase in size and attendant processing logic complexity of carrier's routing database. Thus, the current stat of the art prevents subscribers from defining their own routing parameters that could take advantage of the vast wealth of customer information stored in a subscriber's database to route calls in a manner that is more functional to their business needs and customers requirements.

In response to this need of the marketplace, other prior art systems have tried to overcome some of the limitations of the advanced routing features by forwarding all calls for a specific subscriber to a PBX at one of the subscribers' central locations. Under this approach, the PBX forwards the Automatic Number Identification (ANI) of the caller and the dialed number to an attached processor which retrieves from its database called a "subscriber's database", a destination number for the call. The formulation of this destination number can be predicated on factors such as dialed number, caller's ANI, call handling capacity at all locations as well as information in a customer record retrieved from the subscriber's database. The PBX then uses the destination number to redirect or transfer the call to the appropriate location using, for example, the call redirect pre-ringing feature or the call redirect post answer feature available in the AT&T Definity ® PBX. This solution however, is rather expensive due to the cost associated with the advanced features of the PBX mentioned above. In addition, the PBX solution subjects the caller to post-dial delay inconveniences caused by the call transfer or call redirection mechanism.

Another arrangement which uses a PBX to redirect calls is described in U.S. Pat. No. 4,757,267 issued to B. Riskin on Jun. 17, 1987. The Riskin system uses a processor attached to a PBX to retrieve a destination number for the dealer of a national distributor or manufacturer that is closest to the caller. An alternative embodiment of the Riskin system discloses an arrangement wherein the processor, instead of being attached to the PBX, is linked directly to the carrier's routing database, thereby vitiating the need for the PBX as a call redirecting device. In this alternative embodiment, the carrier's database offloads its route selection functions to the processor which acts as a subscriber's database. Hence, the carrier's database participation in the route selection process is limited to relaying information back and forth between the carrier's originating switch and the subscriber's database. This approach may be arguably adequate for simple applications, such as the dealer locator type of services disclosed in the Riskin patent, wherein the caller entered digits or the NPA and the exchange number of the caller are matched to a destination number. For complex applications however, where multiple types of routing parameters play distinct but complementary roles in the formulation of a destination number for a call, the Riskin approach unduly penalizes the subscriber by forcing him or her to shoulder alone the entire development cost of a routing database and associated routing logic. In addition, Riskin's approach fails to exploit and use the processing and routing logic capabilities of the carrier's database.

The other feature introduced by carriers to help subscribers in their call handling tasks is broadly known as "caller identification" or "caller id" which purports to offer a competitive marketing tool by providing the subscriber with background information regarding the calling party. Automatic Number Identification (ANI), the most common form of caller id, when delivered to a subscriber's PBX, can be used as a key in a database search to retrieve additional information about the caller. This approach is adequate when all calls directed to a subscriber are routed to a single centralized location served by a PBX connected to a processor with a database containing all customer records. However, the caller identification features are less desirable for subscribers with a decentralized business structure or for subscribers who have implemented a distributed computing architecture characterized by each location having its own database storing information about local customers. For those subscribers, the use of ANI as a key in a database search to retrieve additional information about a caller constrains the subscriber to face some economically unattractive choices. One of these choices consists of duplicating the entire customer information database at all locations. Such a choice can become prohibitively expensive as the number of locations increases. In addition, coordination of database maintenance and updating for all locations can transform simple upkeeping tasks into an administrative nightmare. Another choice takes advantage of the advanced routing feature to route a call to a specific location based on the caller's ANI and the location of the database where the caller's records are stored. In that case, the database containing information about local customers is paired to another location's database storing the same information thereby allowing the call to be routed to the second location if the first location is unavailable. However, one of the deficiencies of this approach is that the carrier's database has to store not only callers' ANI data but also additional data indicating the locations where records are stored for all callers associated with a subscriber.

Furthermore, the current architecture of database-queried communication services has prevented carriers to target specific market segments and to discretely differentiate various types of customers. Aiming to circumvent this limitation, some subscribers have assigned different 800 numbers to different classes of customers subject to different treatment. However, this solution is rather rigid and inflexible, since once a priority 800 number is assigned to a customer, he or she would still enjoy the same special treatment using that assigned number regardless of how little benefit may be derived by the subscriber out of that special treatment lavished on the caller.

In summary, the inability of the present architecture of database-queried communication services 1) to process calls based on existing routing parameters in the carrier's database and on functional parameters in the subscriber's database, 2) to allow subscribes to take advantage of the distributed computing trend in data processing and 3) to elevate these services to the additional role of a competitive edge tool for subscribers, is still an unresolved problem for subscribers of these services.

SUMMARY OF THE INVENTION

In accordance with our invention, a system is disclosed to allow database queried telephone calls to be efficiently handled and completed using in a cooperative manner, the aggregate call processing capabilities of a subscriber's database and a carrier's database as part of a total communication switching system. According to one aspect of the invention, selection of a route for a call is initiated when the carrier's database forwards caller's originating information which includes the dialed number and the ANI or Billing Number (BN) of the caller to the subscriber's database through the signaling network or other type of data communication network. The subscriber's database uses information from diverse sources to formulate a processing label for the call. Sources of information available to the subscriber's database include customers' profile information, processing logic tailored to the subscriber's business needs and optionally, status data of call handling resources at various locations. The processing logic in the subscriber's database, analyzes the specific characteristics associated with the call based on the dialed number, the ANI and the corresponding customer profile information and determines the specific criteria for the call to be handled. The subscriber's database processing logic may also indicate a distinct class for the caller, subjecting him or her to a particular call treatment. Based on these criteria and input data from the other sources, the subscriber's processing logic generates a processing label for the call that is forwarded to the carrier's database. The processing label is comprised of a routing label and an end point label which can play two distinct but complementary roles in the final disposition of the call. For certain implementations of our invention, the processing label may also include a billing information label. The routing label provides input data to the carrier's communication switching system for route selection. The end point label, by contrast, consists of a set of alphanumeric characters which denote characteristics associated with a call and/or information to be forwarded by the communication switching system to the terminating PBX (or other CPE). Alternatively, the processing label may include in lieu of the routing label a caller class indicator that instructs the carrier's database to select a specific routing logic associated with a set of locations to determine a destination number for the call. Finally, the third element of the processing label, namely, the billing information label provides to the communications carrier a customized billing rate for the purpose of creating a billing record for the call. This aspect of the invention logically partitions call processing functions between a subscriber's database handling caller's related processing functions and a carrier's database performing subscriber's related call handling and routing functions.

According to another aspect of the invention, information associated with the call such as the ANI and the dialed number is supplemented by caller entered information gathered by a prompting device, which solicits during the call setup process, any necessary information from the caller to delineate the contours of a more precise profile of the caller/customer. The ANI, the dialed number and the caller entered information form what is hereafter referred to as the "originating information" associated with the call. Request for additional information from the caller to complete the originating information for a call can be initiated either by the carrier's database or the subscriber's database. Formulation of a processing label in the subscriber's database and destination number or call treatment in the carrier's database then follows the same pattern outlined above. However, the information obtained through the prompting device allows subscribers significant additional control in the selection of variables and parameters taken into consideration by a carrier's communication switching system to generate call processing commands.

A third aspect of the invention contemplates the carrier's database forwarding the destination number for the call i) first to the originating switch for routing the call, and ii) immediately after the call is completed, to the subscriber's database for updating a file of call handling resources available at all of the subscriber's locations. The call handling resources file in the subscriber's database is further updated by using two alternative techniques. According to the first technique, a preselected average call holding time is used to determine when a resource is free for reuse. The second technique contemplates the originating switch at call termination time sending a call termination message to the carrier's database to indicate that the resource is available for use. The carrier's database in turn, forwards that message to the subscriber's database for the purpose of updating the call handling resources file. This aspect of the invention allows the subscriber's database to keep track of resource utilization at different locations and permits implementation of load balancing without having to deploy a separate network to monitor trunk utilization at all locations.

BRIEF DESCRIPTION OF THE DRAWINGS

In the drawings:

FIG. 2 shows a typical representation of the fields that may be included in the caller class routing and customer routing and processing record stored in the subscriber's database;

FIG. 3 is a layout of typical fields in the Call Processing Record which is the collective set of information (routines, tables options, active/inactive flags, fields) that provides input data for the carrier's database to formulate call handling and routing instructions for calls destined for a particular subscriber;

FIG. 8 presents an illustrative table for a representative subscriber. This table which can be stored in the subscriber's database correlates some special characteristics associated with a call to the codes of extension numbers of a set of locations to which the call can be routed;

FIG. 9 is also an illustrative table of a representative subscriber pairing specific characteristics associated with a call to a code called a service type indicator which is related to a set of locations stored in the carrier's database to which the call can be routed;

FIG. 10 is a layout of the different fields in the processing label for one embodiment of our invention;

FIG. 11 is an illustrative table for a typical subscriber. This table which is stored in the subscriber's database pairs the customer record identification number (policy number) of the caller to a set of locations to which the call can be routed;

FIG. 12 is an exemplary table for a representative subscriber. This table which is stored in the carrier's database correlates each service type label formulated by the subscriber's database to a specific routing logic tree associated with a set of locations and corresponding extension number codes;

FIG. 13 shows a translation table for a typical location matching the extension number code to a couple of real extension numbers. This table is stored in the memory of the CPE equipment at one of the subscriber's locations and FIG. 14 shows an alternative representation of the processing label for a different embodiment of our invention.

FIGS. 15, 16, 17 and 18 represent maps of storage areas containing instructions executed respectively by the carrier's database, the subscriber's database, the ACP and the subscriber's premise equipment.

DETAILED DESCRIPTION

Figure 1:
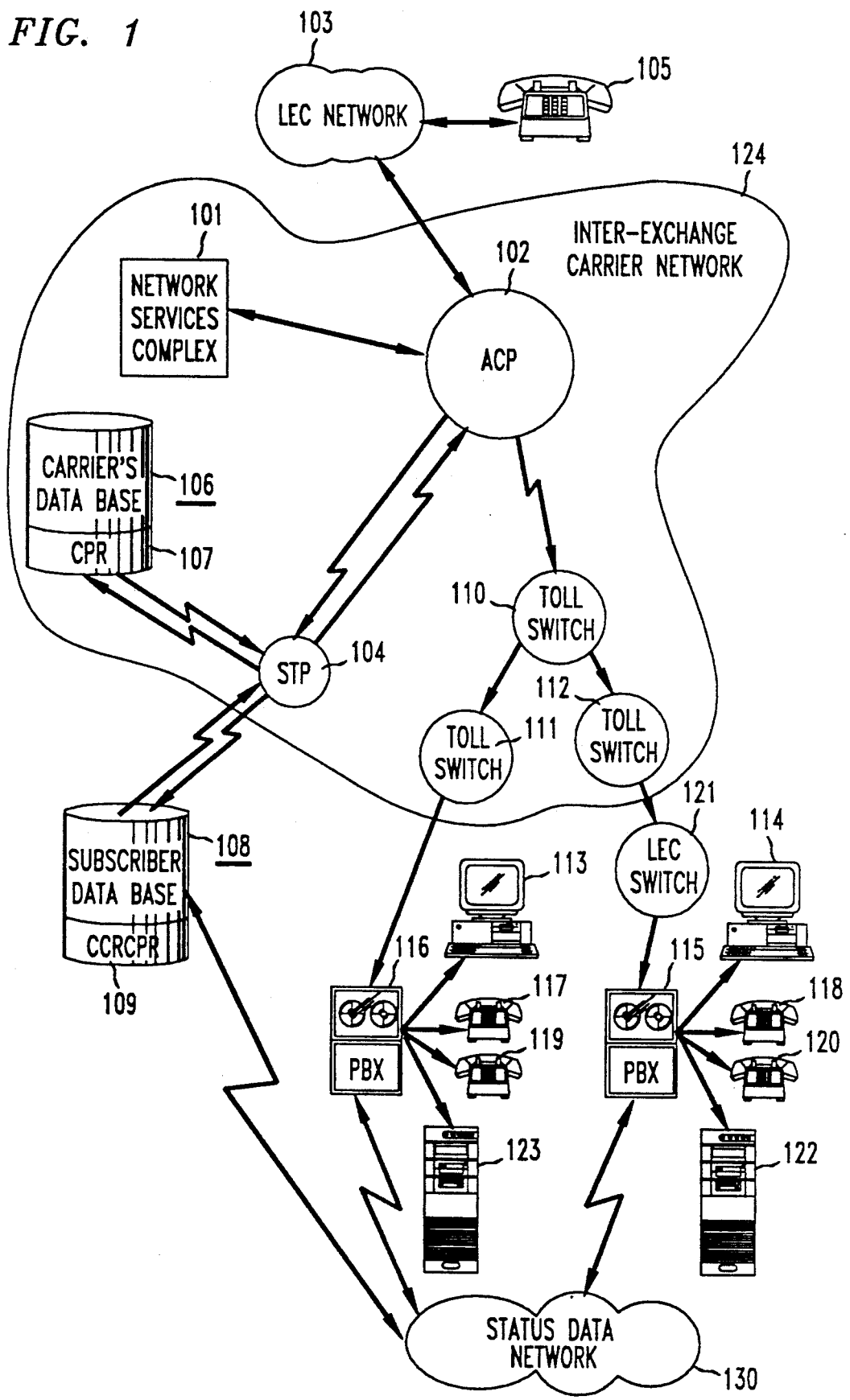
FIG. 1 shows in block diagram form, a configuration for a communication switching system designed to complete database-queried telephone calls through the cooperative processing of a carrier's database and a subscriber's database in accordance with out invention.

FIG. 1 illustrates a configuration for a communication switching system designed to complete database-queried telephone calls through the cooperative processing of a carrier's database and a subscriber's database in accordance with our invention. In FIG. 1, station set 105 is shown linked to Local Exchange Carrier (LEC) telephone network 103 which includes a communication switching system. LEC network 103 is in turn connected to the Interexchange Carrier's ACtion Point (ACP) 102 which performs two primary functions, namely, it operates as the point of entry for all LEC traffic to be switched on interexchange carrier network 124 and it serves as the access point to a Common Channel Signaling network (represented as described below by STP 104) for database-queried telephone calls. The Asmuth et al. patent mentioned above provides a general description of ACP 102. The Common Channel Signaling network is a packet switching network composed of a plurality of interconnected nodes that are used to exchange call handling messages between processor-driven switching systems according to a specific protocol, such as CCS7. An implementation of the CCS7 protocol called CCS7 Network Interconnect (CCS7 NI) can be used for example, to exchange signaling messages between toll switch 112 and LEC switch 121. For the sake of simplicity, the signaling network is represented in FIG. 1 by a single Signal Transfer Point, namely STP 104. The features and functionality of an STP are described in the book "Engineering and Operations in the Bell System," Second Edition, published by AT&T Bell Laboratories, at pages 292 through 294.

FIG. 1 also discloses carrier's database 106 connected to STP 104. Carrier's database 106 consists of a computer system with mass storage which receives originating information regarding the call from ACP 102 via STP 104. Carrier's database 106 runs standard database management system software with call processing primitives to retrieve records and formulate call handling instructions for calls placed to a specific subscriber based on a set of stored parameters. Collectively, the parameters are known as a Call Processing Record (CPR), such as CPR 107 of FIG. 2. Carrier's database 106 may be implemented as a Network Control Point (NCP), which is a processor-controlled centralized data base facility performing all the functions described above. The operation of an NCP is described, for example, in the D. Sheinbein, et al., article on pp. 1737-1744 of *Bell System Technical Journal* (BSTJ), September, 1982, Volume 61, No. 7, Part 3. FIG. 1 also discloses Network Services Complex (NSC) 101 connected to ACP 102. NSC 101 frequently includes a call prompting device and an audio response unit capable of playing announcements and collecting information from the caller in response to commands from ACP 102. Moreover, FIG. 1 depicts various carrier switches, such as toll switch 110, toll switch 111 or 112, and LEC switch 121. These switches are software-driven, processor-controlled telephone systems designed to route calls either from one switch to another or to subscriber premises equipment, such as PBX 115 and PBX 116. A well-known LEC switch is the AT&T No. 5ESS ® which is described in *AT&T Technical Journal*, Vol. 64, No. 6, part 2, pp. 1305-1564, July/August, 1985. A toll switch may be implemented using the AT&T No. 4ESS ® whose features and functionality are explained in great detail in *Bell System Technical Journal* (BSTJ), Vol. 56, No. 7, pp. 1015-1320, September, 1977. FIG. 1 also discloses Status Data Network 130 which is interconnected to PBXs 115 and 116 and subscriber's database 108. Status data packet network 130 can be a public or private data packet network comprised of packet switching facilities interconnected by data lines. The AT&T Accunet Packet Service ® is a good example of a public packet network. Packet switching facilities are described for example, in A. G. Fraser, U.S. Pat. Nos. 3,749,845 of Jul. 31, 1973 and 3,979,733 of Sep. 7, 1976. Finally, FIG. 1 shows processors 122 and 123, which are general purpose computers, such as the AT&T 6386 Personal Computer running standard database management systems applications such as, Informix TM SQL or Oracle TM 4GL.

As mentioned above, Call Processing Record (CPR) 107 in FIG. 1 consists of a set of information which includes logic routines and subroutines, routing table options, various fields and active/inactive flags. For simplicity purposes, a subset of the fields most relevant to our invention is illustrated in FIG. 2. Subscriber Record Identification field 201 uniquely identifies a subscriber within the database system. As its name indicates, Intelligent Call Processing Route Selection field 202 determines for each CPR, whether or not the subscriber requested cooperative call processing features as provided by this invention. Call prompter field 203 indicates whether the subscriber wants a call prompting device to play an announcement to, and collect information from the caller. The content of field 203 may also indicate the type of customized announcements to be played and the maximum number of digits to be collected. Query Capability Switch field 204 offers the subscriber the option of enabling or disabling (temporarily) the entire set of cooperative call processing features provided by this invention, if the subscriber's database is disabled or is not returning appropriate information within a predetermined time interval. Caller Information Forwarding (CINFO) field 205 determines whether the subscriber wants caller entered information or information retrieved from or processed by the subscriber's database to be forwarded to the called party. This option is described in more detail below. Variable billing field 206 offers the subscriber the option of determining the billing rate for the caller on a call-by-call basis. The variable billing rate option is available only for non-toll-free database-queried telecommunication services.

Before describing the fields in CCRCPR 109, a general overview of the major characteristics of subscriber's database 108 might help put the definition of those fields in proper perspective. As indicated above, subscriber's database 108 is comprised of direct access storage devices (DASD) attached to a processor running a standard database management system software and subscriber definable programs. Subscriber's database 108 can be connected to carrier's database 106 either via the common channel signaling network represented in FIG. 1 by STP 104 or alternatively through a data communication network or dedicated lines. Subscriber's database 108 contains records consisting of fields used by the subscriber in the ordinary course of business for purposes such as billing, financial planning, accounting and marketing. Subscriber's database 108 is ordinarily dedicated to one subscriber. However, multiple subscribers receiving on an individual basis a limited number of telephone calls can pool their resources to share one subscriber's database. Subscriber's database 108 primary purpose is to assist carrier's database 106 in formulating routing, processing and call handling commands for calls directed towards the subscriber. One of the set of records stored in subscriber's database 108 is the Caller Class Routing and Customer Processing Record (CCRCPR) 109 which is the counterpart of CPR 107 in carrier's database 106. Like CPR 107, CCRCPR 109 consists of logic routines and subroutines, routing table options and other fields. Unlike CPR 107, however, CCRCPR 109 may contain business related fields under the exclusive control of the subscriber, that can be defined by the subscriber in accordance with his or her specific needs. Since the fields of CCRCPR 109 can vary from one subscriber to another, the fields shown in FIG. 3 constitute an illustrative representation of an average subscriber. Fields 301 and 302 contain information on ANI and Dialed Number respectively. These fields represent different keys used by subscriber's database 108 to retrieve a record for a specific caller. Customer Record Identification 303 can be any set of alphanumeric or numeric characters that uniquely identifies a customer, such as an account number, a credit card number, an insurance policy number or a social security number. Caller entered information can be matched against customer record identification 303 to retrieve a record for a specific caller. Field 304 contains financial information reflecting the caller's past financial dealings with the subscriber. For example, the balance of a loan or the amount of money in a savings account, the face value of an insurance policy or the maximum amount of credit allowable under a credit card number represent samples of the type of information that can be stored in field 304. Field 305 is a business rating code which assesses the likelihood of sales closure with the caller based on previous dealings and other factors. Loyal customers ("Frequent Flyers"), potential purchasers of high profit margin items (credit card "gold" card members) or volume buyers (travel agents) might have separate rating numbers distinguishing them from other potential customers. Field 306 contains account information or personal information about the caller, such as name, age, type of account, etc. Field 307 contains application specific data where the subscriber can store information that is related to a specific service. Finally, field 308 indicates the rate per minute the subscriber would charge a particular caller identified by that record. It should be noted that information indicating caller class can be represented in either the business rating code field or in the application specific data field if the subscriber so desires. Alternatively, caller class indicator can be derived from some form of processing in subscriber's database 108 using as input at least one of the fields in the caller's CCRCPR record as described below.

FIG. 8 represents a table stored in the subscriber's database correlating special characteristics associated with a call to the codes of extension numbers at a set of locations to which the call can be routed. While those figures show only two characteristics for the sake of simplicity and ease of explanation, it is to be understood that multiple characteristics (more than two) can be associated with a call. Simplicity and ease of explanation considerations also motivated the use of extension number codes. The codes could also be used for attendant splits of an Automatic Call Distributor (ACD).

FIG. 9 shows a table correlating characteristics associated with a call to codes associated with specific routing logic trees that trigger the execution of specific routines in the carrier's database.

FIGS. 10 to 14 were described above and because of their self-explanatory nature do not require further elaboration.

In our invention, cooperative call processing involves four distinct steps, which consist of 1) initial call handling by LEC network 103, ACP 102 and carrier's database 106 2) collection of information from the calling party by network services complex 101, if so desired by the subscriber 3) formulation of a processing label by subscriber's database 108, and 4) route selection and call handling process by carrier's database 106 and interexchange carrier network 124. The last step consists of A) selection of a route by carrier's database 106 based on i) the processing label forwarded by subscriber's database 108, ii) routing parameters in carrier's database 106; B) forwarding of the destination number and the field(s) in the end point label to ACP 102; and C) creating a billing record for the call, based on the billing information label (if appropriate).

I. Initial Call Handling Process

Referring to FIG. 1, the initial call handling process is set in motion by a caller at station set 105 dialing for example, an 800 or 900 number which is recognized by Local Exchange Carrier (LEC) network 103 as a database-queried call. The call is then automatically routed by LEC network 103 to one of the interexchange carrier's originating toll switches, namely ACP 102 in FIG. 1. In addition to the dialed number, LEC network 103 also forwards to ACP 102 the Automatic Number Identification (ANI) or the billing number of the calling party. Using the dialed number, ACP 102 then launches a query on its signaling network represented in FIG. 1 by STP 104, to locate the carrier's database that stores the Call Processing Record, such as CPR 107 for the particular subscriber associated with the call. Carrier's database 106 then uses the dialed number information to retrieve the appropriate CPR (e.g. CPR 107) to receive instructions on how to process the call. At this point, the content of the Intelligent-Call-Processing-Route-Select field 202 in FIG. 2 is examined by carrier's database 108 to determine if the subscriber has requested cooperative call processing for the call, as contemplated by this invention. Other fields in CPR 107 associated with cooperative call processing such as Call Prompter 203 and CINFO 204 are also queried for further instructions on how to process the call.

II. Information Gathering and Forwarding Process

Figure 4:
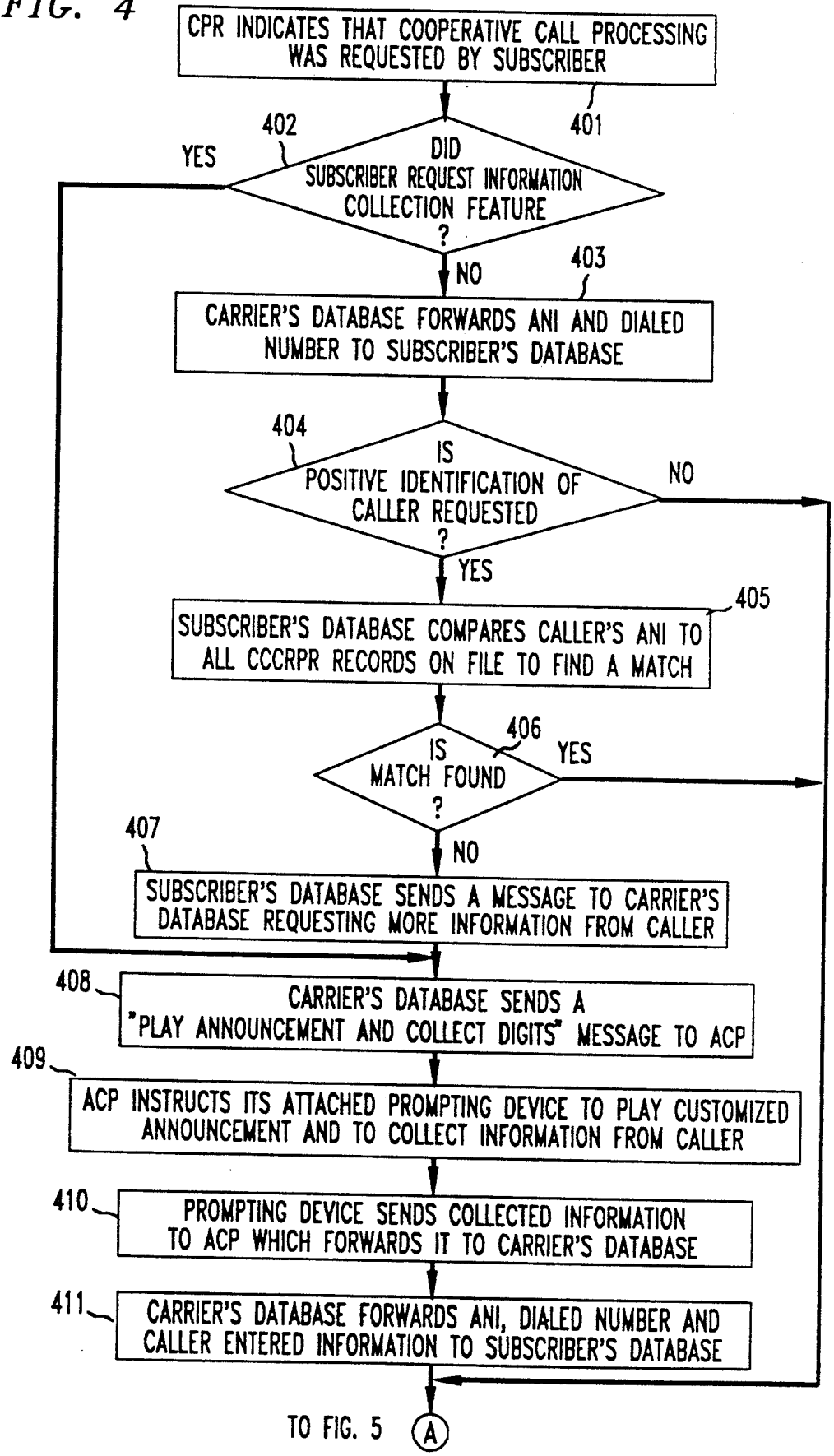
FIG. 4 and FIG. 5 represent flow diagrams of call processing instructions executed by the carrier's database system, the subscriber's database system, the ACP and other system components of FIG. 1 for processing and completing calls.
Figure 5:
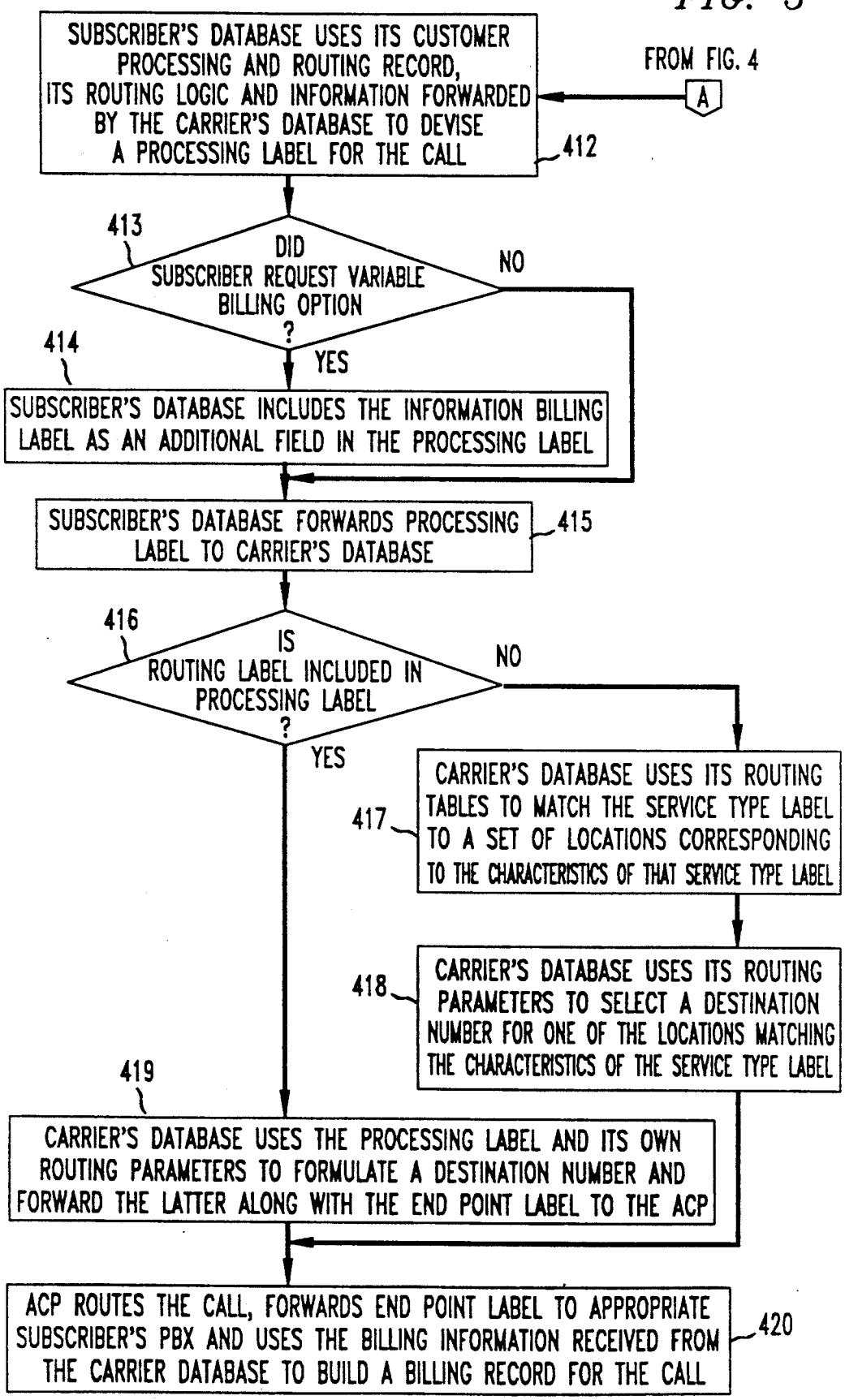

FIG. 4 and FIG. 5 represent flow diagrams of call processing instructions executed by carrier's database 106, subscriber's database 108, ACP 102 and other system components of FIG. 1 for routing and completing calls. Once CPR 107 is examined in carrier's database 106 to indicate in step 401, that the subscriber requested cooperative call processing, a test is made in step 402, to determine if the call prompting option is active. In that event, carrier's database 106 in step 408, sends a message to ACP 102 instructing it to order its attached prompting device, namely network service complex 101, to play an appropriate announcement and to collect information (which may be in the form of digits) from the caller. In the information collection process, network services complex 101, in step 409, leads the caller through a series of steps in order to collect appropriate information from the caller. Information solicited may consist, for example, of personal data, such as (social security number, account number), type of transactions desired (general information, sales, service, billing) or any inquiry suitable to the subscriber's needs. Once the information collection process is completed, Network Services Complex 101, in step 410, forwards all collected information to ACP 102 which in turn, sends it to carrier's database 106. The Asmuth et al. patent mentioned earlier, describes a technique for gathering information from a caller and forwarding such information to a carrier's database. Carrier's database 106, in step 411, forwards the dialed number, the ANI or Billing Number and the information collected from the caller to subscriber's database 108 through the signaling network represented by STP 104 in FIG. 1. Although subscriber's database 108 in FIG. 1 is shown connected to the signaling network represented by STP 104, it is to be understood that subscriber's database 108 could be linked to carrier's database 106 by any kind of data communication network or private lines. Thus, the protocol used by the data communication network to carry the originating information from carrier's database 106 to subscriber's database 108 can be any data communication protocol, such as Common Channel Signaling (CCS7) for the signaling network, Q.931 for an Integrated Services Digital Network (ISDN) Primary Rate Interface (PRI) or X.25 for a data network. It is also worth noting that any exchange of information between carrier's database 106 and subscriber's database 108 is uniquely identified by a transaction id number to facilitate the management in carrier's database 108 of multiple simultaneous transactions from multiple subscribers. If the content of Call Prompter field 203 indicates that the subscriber did not request call prompting features, the dialed number and the ANI are forwarded by carrier's database 106 to subscriber's database 108, as described in step 403. For certain applications (such as multiple subscribers sharing one subscribers' database) some subscribers may not want to subject all callers to post dial delay inconveniences associated with collection of information from the caller using a call prompting device. Yet these same subscribers may have a requirement for a positive identification of the caller in order to provide the individualized level of service demanded by their customers. Accordingly, a test is made in step 404, to determine if positive identification of the caller is required to process the call. If the positive caller identification requirement is absent, the formulation of the processing label module described below, is immediately initiated. If positive identification of the caller is required however, the ANI received from the caller is compared, in step 405, to all CCRCPR records to determine, in step 406, if there is a record on file for the caller. If a record matching the caller's ANI is located, the formulation of the processing label described below is initiated. If no record matching the caller's ANI is found, subscriber's database 108, in step 407, sends a message to carrier's database 106 requesting solicitation of information from the caller. Steps 408, 409, 410 and 411 described above in the information collection process are then sequentially performed.

III. Formulation of Processing Label

Upon receipt of the originating information for the call, subscriber's database 108 uses the ANI and the caller entered information if available, to retrieve in step 412, additional information about the caller from the CCRCPR record. Information retrieved can be caller specific, such as financial information in field 304 or account information in field 306 of FIG. 3. For example, the ANI and/or caller entered information of a call directed to a bank can advantageously be matched with the corresponding account information, such as the account number and other related financial information about the caller, such as loan balance, amount of money in savings deposit, etc. Alternatively, information retrieved can be group oriented, as opposed to being individualized, wherein a caller is associated with a class of customers based on its ANI. The ANI in this case, is used as a key in a database search to retrieve information about that class such as Potential Business Rating Code in field 305 of FIG. 3. For example, calls characterized by their ANI or caller entered information as originating from "gold" card members of a credit card company may put the caller in a class entitled to different treatment than a similar call from a regular credit card member.

Once subscriber's database 108 has classified or positively identified the caller, it uses a) the CCRCPR retrieved for the call, b) its processing logic and c) associated routines to formulate a processing label for the call. An example which illustrates two different methods outlining the steps (FIG. 6 and FIG. 7) leading to the formulation of a processing label is provided below. In order to facilitate a better understanding of the example and to shed some light on some of its intricacies, a general explanation of pertinent key concepts and their interaction within the framework of our invention is provided first.

The subscriber's database processing logic is essentially a set of decision-based rules that trigger the execution of specific routines as a logical function of the value of certain application specific parameters along with the value of the ANI, the caller entered information, the dialed number or any field in the CCRCPR. The processing label formulated by subscriber's database 108 is composed of two distinct but sometimes complementary elements and possibly a third component called the billing information label. FIG. 10 and FIG. 11 show two possible layouts of the fields in the processing label. As shown in FIG. 10, one of the elements of the processing label called an end point label, is a code comprised of one or two fields depending on the application. The first field which is present for most applications is represented by end-point-label-1 in field 1002. It identifies either a class or individualized characteristics associated with the caller. These characteristics may include, for example, estimate of caller's income, purchasing history of the caller (occasional buyer, loyal customer, end user, retailer), type of transactions desired by the caller, face value of the insurance policy of the caller, amount in the certificate deposits of the caller, native language of the caller, to name a few. The characteristics identified by the end point label are paired in records stored in subscriber's database 106, with codes for specific extension numbers (or attendant split positions) at subscriber's locations, staffed by attendants with the appropriate skills set to handle the call. FIG. 8 shows a table mapping characteristics to locations and extension codes.

End-point-label-2 in field 1003 may consist of a set of alphanumeric characters that are forwarded by subscriber's database 108 to carrier's database which passes it unaltered to the terminating PBX via the carrier's communication switching system. In its simplest form, it can be displayed on monitors such as monitor 114 or monitor 113 for the benefit of the attendant answering the call, thereby facilitating call handling tasks. Types of information displayed may include, for example, caller entered information or application specific data retrieved from or processed by subscriber's database 108. If the subscriber has a processor, such as processor 122 or 123 in FIG. 1 attached to PBX 115 or PBX 116, sophisticated applications can use the contents of end-point-label-2 as a key for local database search operations on processor 122 or 123 to retrieve information for display to an attendant answering the call.

The routing label in field 1001, on the other hand, represents a code indicating all locations with stations corresponding to the characteristics identified by the end point label. More specifically, the routing label is a pointer forwarded by subscriber's database 108 to carrier's database 106 that restricts the number of locations considered by carrier's database 106 in selecting a destination number for the call. The routing label also triggers the execution of a tree-structured logic routine in carrier's database 106. The routing label can indicate, for instance, all the locations that meet the requirements designated by the end point label or locations to which the call should not be forwarded because of lack of call handling resources. Carrier's database 106, however, does not make use of the end point label in its decision process.

Although the processing label ordinarily consists of a routing label, an end point label and optionally a billing information label, an alternative embodiment of this invention provides for the omission of the routing label from the processing label. In this case, the layout of the processing label can be represented by FIG. 14. For this embodiment, CPR 107 in the carrier's database must contain an additional table called an "initial routing table" that may be represented by FIG. 12. This table correlates the characteristics associated with the call indicated in this case, by the service type label in field 1401 to a routing logic tree associated with a set of locations and extension codes corresponding to stations staffed by attendants with the appropriate skills set.

Once the routing label or service type label has been devised by subscriber's database 108, a test is made in step 413, to determine if the variable billing option is active. The test is performed by looking at the first byte in the billing rate field 308 in the CCRCPR where the "1=ACTIVE, 0=INACTIVE" indicator allows a quick screening. If the subscriber requested the variable billing option, then subscriber's database 108 moves the billing rate to the billing information label field in the processing label record. Alternatively, subscriber's database may use a stored billing algorithm to devise a customized billing rate for the call. Thus, the billing information label allows subscribers to bill callers on a call-by-call basis for non-toll-free database-queried telecommunications services such as 900 or 700 numbers. Various kinds of flexible billing algorithms can be devised in subscriber's database 108. For example, volume callers can get automatic discounts after the number of calls completed by a corporate customer has reached a certain level. If the variable billing option is not active, or after the billing information label has been added to the processing label, subscriber's database 108 in step 415, forwards the processing label for the call to carrier's database 106.

The following example illustrates how the processing label is formulated by subscriber's database 108, and captures the essence of the synergy between the routing label and the end point label. Let us assume that an insurance company has a total of ten locations with five locations on the east coast (A, C, E, G and I) and five locations on the west coast (B, D, F, H, J). Those locations are staffed by telephone attendants managed by a supervisor and an assistant supervisor at each location. Let us further assume that the company wants all calls from holders of an insurance policy with a face value of a million dollars or more to be routed to either the supervisors or the assistant supervisors at certain locations most knowledgeable in the two principal lines of business of the company namely, life insurance and property insurance. Similarly, the company wishes to route calls from holders of policy with a face value between half a million dollars and a million dollars to no more than two stations at certain locations staffed by product specialists with excellent interpersonal skills and expert knowledge in either life or property insurance. Calls from other policyholders can be routed to any attendant at any location so long as records of their policies are stored in a local database. Accordingly, the subscriber's database for this insurance company is comprised of a first table in memory (FIG. 8) correlating the characteristics of a policy to a set locations and a code for a set of extension numbers to which a call regarding that policy can be directed. For policies whose face value is less than half a million dollars however, a different table in FIG. 11 pairs a policy number to a set of locations where the policy records are stored. Thus, holders of property or life insurance policy with a face of half a million dollars or more will have their records stored at every location and accordingly, can have their calls routed to any other location if the preferred locations are not available. The "routing to alternate location on busy" feature of some prior art systems can be used to reroute call for those policyholders if the preferred locations are not available. Our invention can be implemented for this insurance company in one of two ways namely, by formulating a processing label with or without a routing label. The method of devising a processing label with a routing label is described in FIG. 6, while the system for formulating a processing label without a routing label is explained in FIG. 7.

Figure 6:
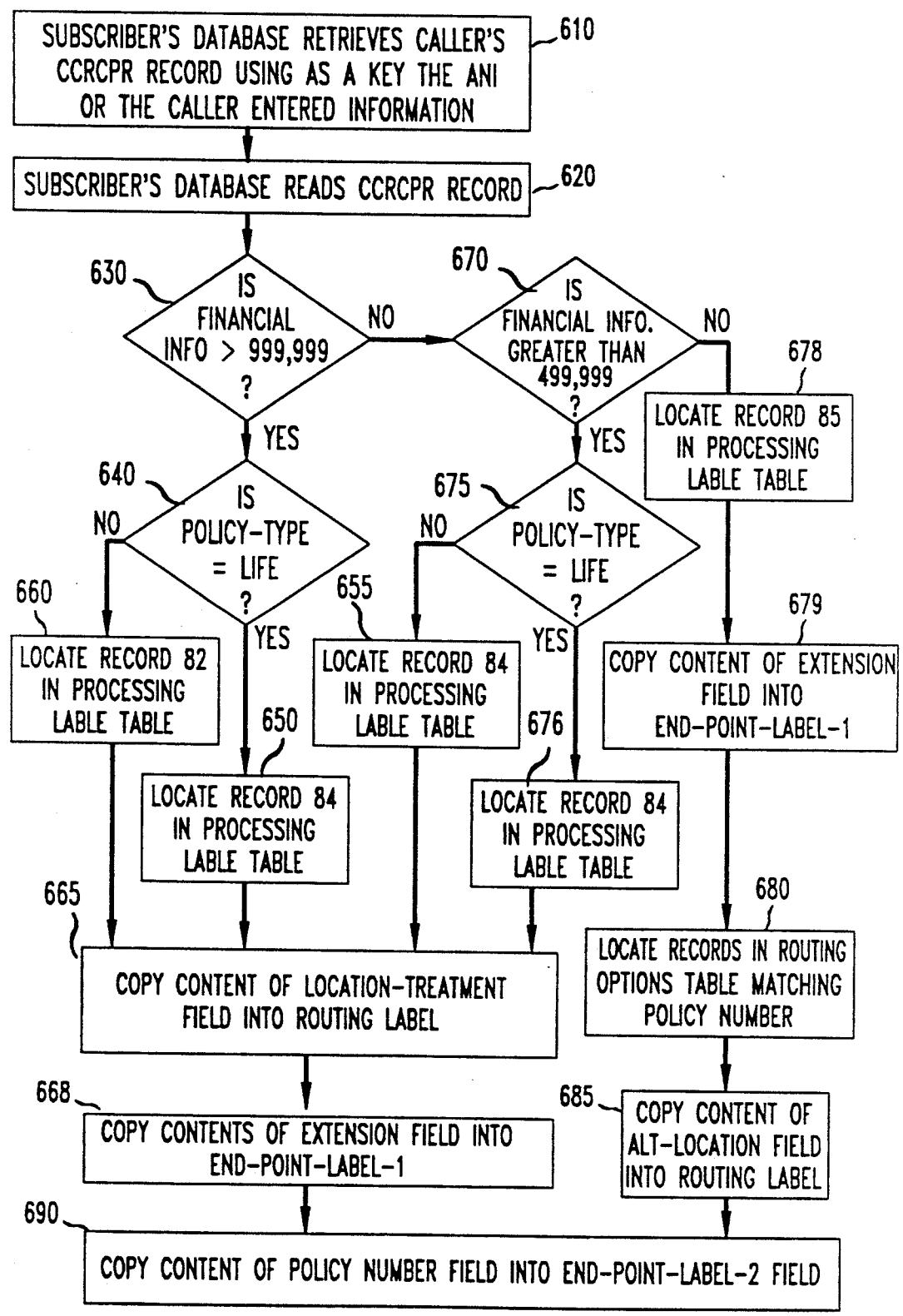
FIG. 6 and FIG. 7 present in flow diagram form detailed instructions regarding the formulation of some of the components of a processing label by the subscriber's database for a representative subscriber.

In FIG. 6, the process of creating a processing label is initiated by subscriber's database 108 retrieving in step 610, caller's CCRCPR record using as a key, either the ANI of the caller received from carrier's database 106 or the Caller Entered Information also received from carrier's database 106. The ANI of the caller is matched to ANI field 301 in one record of CCRCPR 109 or in the case of caller entered information, the latter is matched to customer record identification field 303 which contains information such as the caller's policy number or social security number. Subscriber's database 108 in step 630, compares the face value of the policy contained in financial information 304 to a fixed number (999,999) to ascertain whether it is worth a million dollars or more. If so, subscriber's database 108, in step 640, checks the policy type to determine if it is a life or property insurance policy. If the face value of the life policy of the caller is worth a million dollars or more, subscriber's database 108 then, in step 650, locates record 81 in FIG. 8 and copies the contents of two fields in that record, namely, location-treatment field and extension code field respectively to routing label 1001 and end-point-label-1 1002 of FIG. 10 in steps 665 and 668. If the face value of the policy for the caller is worth a million dollars or more and the policy is for property coverage, as opposed to life coverage, subscriber's database 108 in step 660, would locate record 82 in the Processing Label Table I (FIG. 8). Then, in steps 665 and 668, the contents of the location-treatment field and the extension code fields would be copied respectively in routing label 1001 and end-point-label-1 of FIG. 10. If the face value of the policy is worth less than a million dollars, subscriber's database 108 in step 670, performs a test to determine if the face value of the policy exceeds 499,999 dollars. If it is, subscribers database 108 checks the type of insurance coverage involved (life or property) in step 675. If the policy provides life coverage, record 83 in FIG. 8 is located in step 676, and steps 665 and 668 are performed as described earlier. For a property policy with a face value between half a million and a million dollars, record 84 of FIG. 8 would be located in step 655, and steps 665 and 668 would be performed as described above. If the face value of the policy is less than half a million dollars, record 85 in FIG. 8 would be located in step 678, and the content of the extension field for that record, in step 679, would be copied into end-point-label-1 1002 field of FIG. 10. Furthermore, in step 680, the policy number contained in customer record identification 303 of CCRCPR 109 is used to locate the record in FIG. 11 matching the policy number. The content of the alternative location field in that record is then copied in step 685, to routing label 1001 field in FIG. 10. Finally, in step 690, the policy number stored in customer record identification field 303 of CCRCPR 109 is then copied in end-point-label-2 103 field of FIG. 10 regardless of the face value or the type of coverage for the caller's policy. The policy number in end-point-label-2 103 of the processing label may be used by processor 122 or 123 of FIG. 1 to retrieve additional information about the caller for the purpose of facilitating call handling tasks by the attendant. Thus, in our example, the places in which records for insurance policies with a face value of less than half a million dollars are stored in regional databases also called premises databases (represented in FIG. 1 by processors 122 and 123), dictate the choice of locations for call routing. Hence, FIG. 11 which pairs policy number to locations with regional databases where records of these policies are stored provides the locations to route a particular call. For policies with face value of half a million dollars or more however, the locations and the specific extension behind the PBX for that location are provided directly from the Processing Label Table I of FIG. 8. It is worth noting that the location/treatment field in FIG. 8 can also direct carrier's database 106 to play an announcement for the call in lieu of routing it to a subscriber's location. Thus, if the location/treatment field for example, is equal to "P", carrier's database would then play the specific announcement indicated by code "P".

Figure 7:
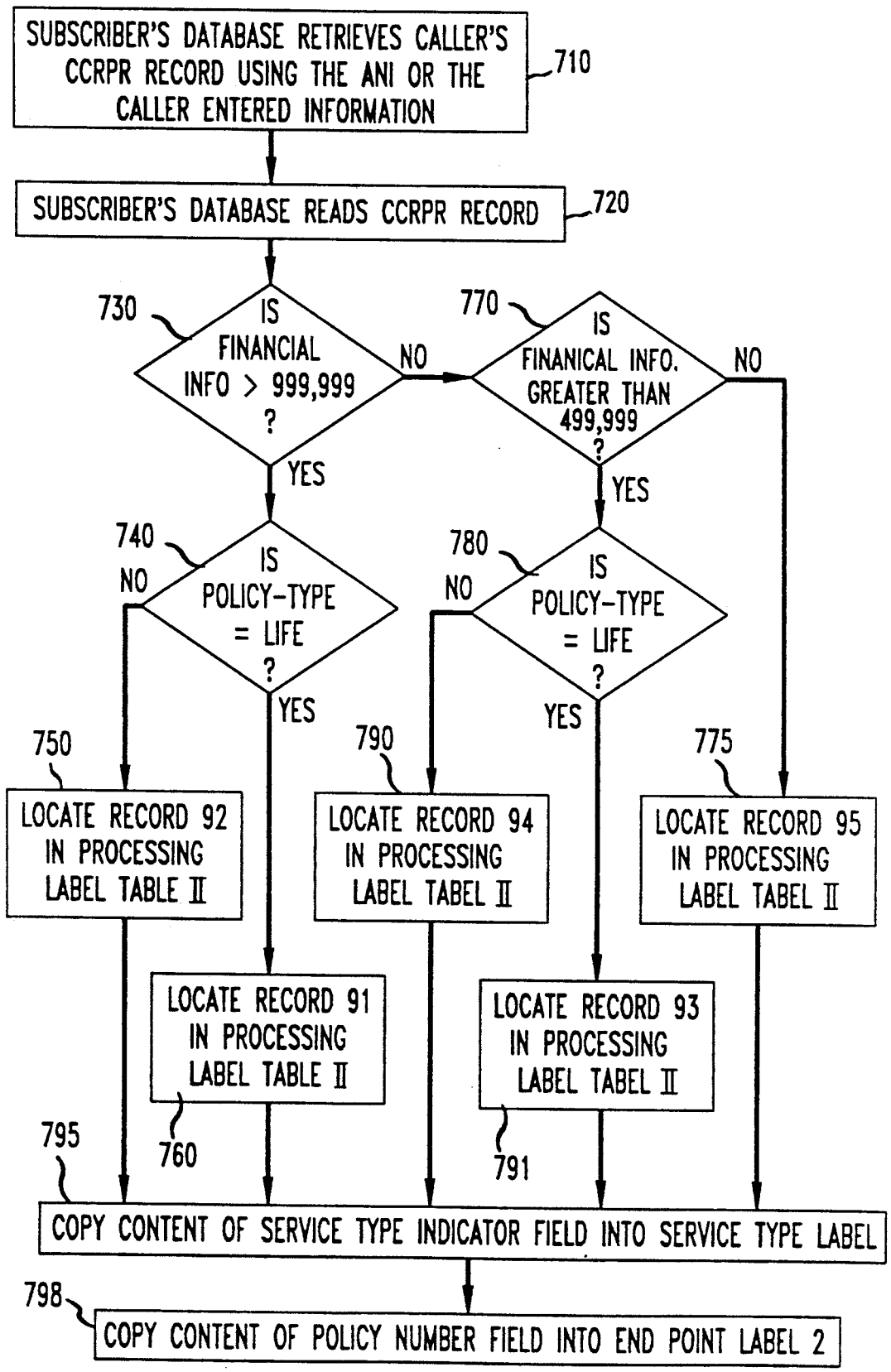

As mentioned above, our invention has an alternative embodiment for the creation of a processing label without a routing label. FIG. 7 illustrates how the insurance company in our example, can create such a processing label. The process is initiated in step 710, by subscriber's database 108 retrieving from CCRCPR 109 the caller's record using as a key either the ANI or the caller entered information received from carrier's database 106. The record is read in step 720, and the face value of the policy contained in the financial information field 304 (FIG. 3) is analyzed in step 730, to determine if it is worth a million dollars or more. In that event, the policy type is checked in step 740, to ascertain if the caller/policyholder has a life or property coverage. If the caller has life coverage worth a million dollars or more, record 91 of FIG. 9 is located in step 760, and the content of the service type indicator field of record 91 in FIG. 9 is copied into the service type label field 1401 of FIG. 14 as described in step 795. In addition, the policy number contained in customer record identification field 303 of the CCRCPR is copied into the end point label 1402 field in FIG. 14 as indicated in step 798. If the insurance policy for the caller has a face value of a million dollars or more for property coverage, in that case, in step 750, record 92 of FIG. 9 would be located and steps 795 and 798 would be performed as described above. However, if the face value of the policy is less than a million dollars, a test would be performed in step 770, to determine if the face value of the policy is worth half a million dollars or more. If so, a second test is performed in step 780, to check the type of coverage for the policy. If the policy type is life, record 93 of FIG. 9 would be located in step 791 and steps 795 and 798 would then be performed as indicated above. In case the coverage for the half-million dollar policy is for property, record 94 would be located in step 790, and steps 795 and 798 would be performed as indicated above. If the face value of the policy is worth less than half a million dollars, record 95 would be located in step 775, and steps 795 and 798 would be executed as described above. The major difference between the processing lable with a routing label and the processing label without a routing label lies in the fact that in the first case, only minor changes have to be undertaken in carrier's database 106 as it exists in the prior art. In the case of the processing label without a processing label, carrier's database 106 has to be modified as described below.

IV. Route Selection, Switching and Call Handling Process

Referring still to FIG. 5, subscriber's database 108 forwards to carrier's database 106 in step 415, the processing label that it has formulated in the previous steps. After receiving the processing label, carrier's database 106 in step 416, analyzes the processing label to determine if the routing label is included in the processing label. When the routing label is part of the processing label, carrier's database 106, in step 419, retrieves the CPR for the subscriber and uses a) its own routing parameters b) its routing logic, and c) the routing label to devise a destination number for the call. Routing parameters that can be used to influence the formulation of the destination number include time of day, day of the week, day of year, the number of calls in queue at a given time for a specific location (if applicable), the number of simultaneous calls in progress at a given destination, etc. The processing of the call by carrier's database 106 follows almost the same basic pattern established by the prior art (U.S. Pat. Nos. 4,611,094, 4,162,377, 4,191,860, 4,371,752). When the routing label is included in the processing label, our invention simplifies carrier's database 106 task in the selection of the final destination for the call since it limits its choice of locations for selecting a destination number for the call.

If the processing label forwarded by subscriber's database 108 does not have a routing label component, carrier's database 106, in step 417, uses the service type label 1401 field to locate the appropriate record in the initial processing table described in FIG. 12. The record whose routing logic tree indicator matches service type label 1401 in the processing label, points carrier's database 106 to a subtree routing logic associated with the characteristics of the call matching a set of locations and at least one station staffed by attendant with the appropriate skills set. The routing logic tree indicator retrieved by the record triggers the execution of a set of instructions that lead to the selection of a destination number for the call. For example, in the case of our insurance company, if the service type label forwarded to carrier's database 106 by subscriber's database 108 is equal to "L2", then carrier's database 106 would execute the set of tree structured chain of routing instructions stored under "L2". Accordingly, carrier's database 106 would use the pointed routing logic and associated routing parameters to select a destination number for the call from the list of potential locations matching the characteristics associated with the call. As mentioned above, carrier's database 106 in step 419, uses any of the methods in the prior art to select the final destination number for the call. Carrier's database 106 then, in step 420, forwards the destination number and the end point label (or the extension code in the case of a processing label without a routing label) to ACP 102, which uses interexchange carrier network 124 to route the call to the appropriate location. The two fields in the end point label (or end-point-label-2 and the extension code in the case of a processing label without a routing label) are passed to the PBX at the terminating location if the content of CINFO field 305 in FIG. 3 indicates that the subscriber so desires. If the call is destined for a station connected to PBX 115, then those fields are passed unaltered through LEC switch 121 (assuming CCS7 NI is implemented in the LEC Network). If the billing information label is part of the processing label, ACP 102 uses the billing information label to build a billing record for the call. The end-point-label-1 or the extension code number is matched in the CPE routing table in FIG. 13 to one of the appropriate stations such as telephone set 117, 118, 119 or 120, staffed by attendants with the appropriate skills set. Moreover, end-point-label-2 can be forwarded by PBX 116, for example, to attached processor 123, for use as a key in database search operations to retrieve additional information about the caller. The retrieved information can be displayed on CRT 113 for the attendant answering the call at station set 117.

The use of end-point-label-2 in database search operations at subscriber's locations, allows subscribers to implement a truly distributed call processing architecture. More specifically, this aspect of our invention allows subscribers to deploy small regional databases at their locations where records with certain characteristics are duplicated only in certain regional databases. This negates the need to store detailed information regarding every customer in the subscriber's database and at every regional database. For example, if a subscriber has ten locations but only two locations staffed by attendants fluent in Spanish, records of callers identified as fluent only in Spanish would be stored only in the subscriber's database and the regional databases of those locations as opposed to being replicated at every location.

If subscriber's database 108 is disabled or does not forward the processing label to carrier's database 106 within a predetermined time interval, carrier's database 106 may use default routing logic specified by the subscriber to complete the call.

Figure 17:
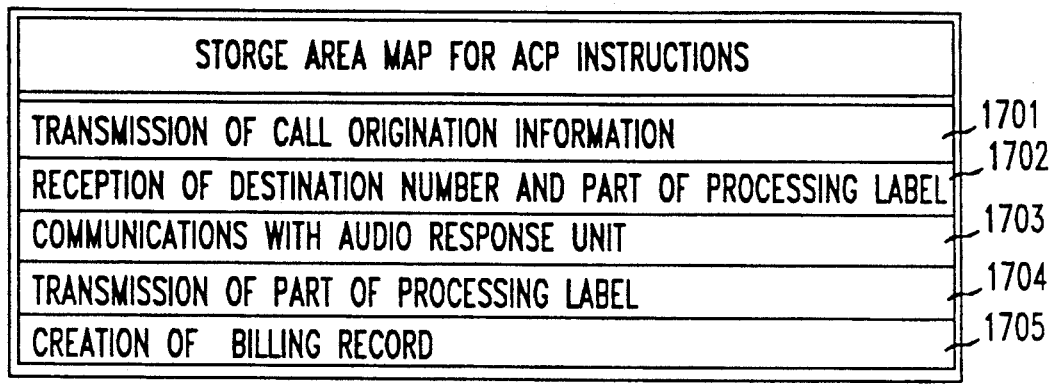
Figure 18:
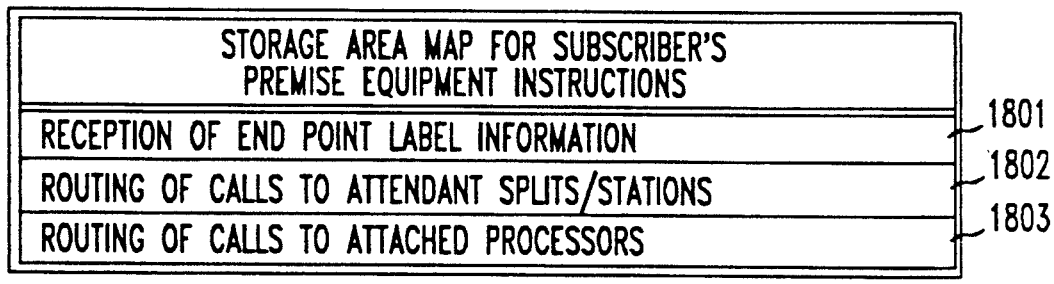

As stated above, carrier's database 106, subscriber's database 108, ACP 102 and PBX 116 have intelligence and therefore are capable of processing stored program instructions. FIGS. 15 through 18 depict graphically maps of individual areas of storage within those components in which those programmed instructions are stored for performing the processes and steps described above. In particular, FIG. 15 illustrates areas 1501 through 1510 in which instructions are stored for carrier's database 106. Likewise, FIG. 16 depicts areas 1601 through 1607 storing instructions to be executed by subscriber's database 108. Similarly, FIG. 17 shows storage areas 1701 through 1705 containing instructions executed by ACP 102. Finally, FIG. 18 presents similar areas from 1801 through 1803 storing instructions for a subscriber's premise equipment such as PBX 116 or PBX 115.

From the foregoing, it may be observed that our invention allows a subscriber's database to place callers in different classes, subject to separate call treatments triggered by a specific processing label based on the customer's ANI or caller entered information and the associated customer's record. Hence, subscribers can readily identify and discretely differentiate certain vital customers for specialized treatment. For example, during a peak traffic (busy) hour the subscriber's database can instruct the carrier's database through the processing label to play a call-back announcement or to queue a call from an ANI-identified information seeking customer in order to preserve call handling resources for potential revenue generating customers.

Moreover, functional routing parameters tailored to the specific needs of a subscriber's business are best understood by the subscriber, and therefore best optimized in the subscriber's database. Accordingly, communications carriers are relieved of the need to undertake costly and time consuming networking development efforts to meet subscribers' diverse requirements. Our invention permits routing functions to be logically partitioned between carrier's database and subscriber's database wherein carrier's database handles general network related routing functions and subscriber's database is responsible for customer-specific, business oriented routing functions. Furthermore, the call-by-call routing feature made possible with this invention allows subscribers to differentiate their products and services from their competitors through better customer satisfaction by offering, for example, personalized services and higher level of responsiveness for preferred or loyal customers. For example, calls can be directed to a specific group of attendants based on specific characteristics of the caller such as the native language of the caller.

The above description is to be construed as only an illustrative embodiment of this invention. Persons skilled in the art can easily conceive of alternative arrangements providing functionality similar to our invention without any deviation from the fundamental principles or the scope of this invention.

What is claimed is:

1. A method for processing database-queried calls through a communication switching system which includes:
   i) a first database storing call handling and routing information;
   ii) a second database which is connected to said first database and which stores subscriber information including callers' related information; and
   iii) a source of call origination information,
   wherein said method includes the steps of:
      generating a first call process information by applying said call origination information to said first database;
      transmitting said first call process information to said second database;
      retrieving in said second database said stored callers' related information using said first call process information as a retrieval key;
      generating in said second database a second call process information as a joint function of said retrieved stored callers' related information and said first call process information;
      transmitting said second call process information to said first database; and
      formulating in said first database processing instructions comprised of a destination number for routing and handling said call using said second call process information.

2. The method of claim 1 wherein said second call process information is a processing label which includes at least one of the following fields i) a routing label which provides routing input data to said carrier's database ii) an end point label which denotes characteristics associated with calls iii) a billing information label which contains data for creating a billing record for said calls.

3. A method for processing database-queried calls through a communication switching system which includes:
   i) a first database storing call processing programs and call handling and routing information and;
   ii) a second database which is connected to said first database and which stores subscriber information including routines and callers' related information; and
   iii) a source of call origination information,
   wherein said method includes the steps of:
      receiving in said first database said call origination information;
      retrieving from said first database said stored call handling and routing information which instructs said first database to send said call origination information to said second database;

transmitting said call origination information to said second database in order for said second database to execute said stored routines using as input said caller's related information and said call origination information to generate call process information;

receiving in said first database said call process information from said second database;

executing in said first database said call processing programs to determine a destination number and a call treatment for said call using as input said call process information and said stored call handling and routing information.

4. The method of claim 3, wherein said call treatment includes directing said call to an audio response unit.

5. A method for processing database-queried calls using the call processing capabilities of a communication switching system, which includes:

i) a carrier's database which receives call originating information from an originating switch, and which stores a plurality of carrier definable call processing programs, call handling instructions and routing parameters associated with a subscriber; and ii) a subscriber's database which stores subscriber definable programs, parameters and callers' related information, and which has a connection to said carrier's database, wherein said method comprises the steps of:

a) retrieving from said carrier's database said call handling instructions which direct said carrier's database to forward said call originating information to said subscriber's database via said connection;

b) sending said call originating information to said subscriber's database so that said subscriber's database can execute said subscriber definable programs to formulate a processing label in said subscriber's database as a logical function of the value of said call originating information and said caller's related information associated with said originating information;

c) receiving in said carrier's database via said connection, said processing label from said subscriber's database;

d) executing said call processing programs in said carrier's database using as input data said processing label information and said routing parameters to select a destination number for said call wherein said destination number conforms to characteristics denoted in said processing label; and e) forwarding said destination number and at least part of said processing label from said carrier's database to said originating switch in order to route said call to a subscriber's location using said communication switching system.

6. The invention defined in claim 5, wherein the subscriber definable programs are comprised of:

a) decision instructions which i) compare values of at least one of a plurality of stored fields in a record associated with a caller to predefined parameters and ii) derive action instructions from said comparison; and b) action instructions which specify i) input data to be evaluated in the execution of call processing programs in said carrier's database and ii) commands for specific functions to be performed by said carrier's database.

7. The method of claim 5, further including the step of said carrier's database instructing said originating switch to direct an attached call prompting device to solicit and collect information from said caller to supplement said originating information prior to forwarding said originating information to said subscriber's database.

8. The method of claim 5, further including the steps of:

determining in said subscriber's database if a record exists for said caller; and directing said carrier's database to instruct said originating switch to solicit and collect information from said caller upon a negative outcome of said determining step.

9. The method of claim 5, wherein, said originating information passed by said carrier's database to said subscriber's database includes:

i) the Automatic Number Identification (ANI) of a calling station;

ii) a called number; and iii) caller entered information.

10. The method of claim 5, wherein said processing label includes at least one of the following fields:

i) a routing label which provides routing input data to said carrier's database;

ii) an end point label denoting characteristics associated with said call;

iii) a billing information label which contains data for creating a billing record for said call.

11. The method of claim 10 further including the step of subscriber's premise equipment at said subscriber's location receiving said call and routing said call to one of a plurality of attendant split positions as a function of the information contained in said end point label.

12. The method of claim 11 further including the step of said subscriber's premise equipment forwarding said end point label to display monitors.

13. The method of claim 11 further including the step of said subscriber's premise equipment forwarding said end point label to an attached processor to retrieve additional information about said call.

14. The method of claim 5 further including the steps of:

determining in said carrier's database the operational status of said subscriber's database; and invoking a default routing logic when said subscriber's database is disabled.

15. The method of claim 5 further including the step of said carrier's database temporarily disabling communications with said subscriber's database upon instructions from said subscriber.

16. The method of claim 5 further comprising the steps of:

receiving in said carrier's database at call termination, a call termination message from said originating switch;

receiving in said subscriber's database said call termination message sent by said carrier's database; and updating a call handling resources file in said subscriber's database using said received call termination message.

17. The method of claim 10 wherein said routing label directs said carrier's database to route said call to an audio response unit capable of emitting a plurality of announcements, and wherein one of said announcements is selected as a function of the value of said end point label.

18. The method of claim 10 wherein said billing information label is forwarded by said carrier's database to said originating switch for the purpose of creating a billing record for said call after said call has been terminated.

19. The method of claim 5, wherein said forwarding step by said carrier's database of said destination number to said originating switch further includes the step of sending said destination number to said subscriber's database after said call has been completed; and wherein said method includes updating a file of call handling resources available at all subscriber's locations in accordance with said forwarded information.

20. The method of claim 19 wherein records of said updated call handling resources file in said subscriber's database are used as input data in the formulation of said processing label 21. The method of claim 10, wherein said routing label associates said call to a specific class triggering the execution of specific routing tree instructions in said carrier definable programs in said carrier's database to determine a treatment for said call.

22. A method of routing a caller-initiated database-queried call to a subscriber's premise equipment and forwarding to said subscriber's premise equipment information associated with said call, using the call processing capabilities of a communication switching system comprised of:
   i) an originating switch which receives from the caller originating information associated with said call;
   ii) a carrier's storage and processing facility storing carrier definable call processing programs, subscriber's related call processing information and routing parameters; and
   iii) a subscriber's storage and processing facility storing subscriber definable programs and callers' related information,
   wherein said method comprises the steps of:
   a) retrieving in said carrier's storage and processing facility initial call handling instructions based on said subscriber's related call processing information;
   b) forwarding to said subscriber's storage and processing facility said originating information associated with said call so that said subscriber's storage and processing facility can execute said subscriber definable programs to formulate a processing label identifying with a code a plurality of stations with specific characteristics associated with said call at any of a plurality of locations;
   c) receiving said processing label in said carrier's storage and processing facility and devising a destination number for said call in said carrier's storage and processing facility using at least part of said processing label and said carrier's storage and processing facility routing parameters;
   e) forwarding said destination number and part of said processing label to said originating switch;
   f) routing said call to said subscriber's premise equipment using said communication switching system; and
   g) forwarding part of said processing label to said subscriber's premise equipment for the purpose of directing said call to one of a plurality of specific stations connected to said subscriber's premise equipment.

23. A system for processing database-queried calls through a communication switching system which includes:
   i) a first database storing call handling and routing information;
   ii) a second database which is connected to said first database and which stores subscriber information including callers' related information; and
   iii) a source of call origination information,
   wherein said system includes:
   means for generating first call process information by applying said call origination information to said first database;
   means for transmitting said first call process information to said second database;
   means for retrieving in said second database said stored callers' related information using said first call process information as a retrieval key;
   means for generating in said second database second call process information as a joint function of said retrieved stored callers's related information and said first call process information;
   means for transmitting said second call process information to said first database; and
   means for formulating in said first database processing instructions comprised of a destination number for routing and handling said call using said second call process information.

24. A system for processing database-queried calls through a communication switching system which includes:
   i) a first database storing call processing programs and call handling and routing information and;
   ii) a second database which is connected to said first database and which stores subscriber information including routines and callers' related information; and
   iii) a source of call origination information,
   wherein said system includes:
   means for receiving in said first database said call origination information;
   means for retrieving from said first database said stored call handling and routing information which instructs said first database to send said call origination information to said second database;
   means for transmitting said call origination information to said second database in order for said second database to execute said stored routines using as input said caller's related information and said call origination information to generate call process information;
   means for receiving in said first database said call process information from said second database;
   means for executing in said first database said call processing programs to determine a destination number and a call treatment for said call using as input said call process information and said stored call handling and routing information.

25. The system of claim 24, further including means in said first database to select a destination number as call treatment.

26. The system of claim 24, further including means in said first database to direct said call to an audio response unit as a form of call treatment.

27. A system for processing database-queried calls using the call processing capabilities of a communication switching system, which includes:

i) a carrier's database which receives call originating information from an originating switch, and which stores a plurality of carrier definable call processing programs, call handling instructions and routing parameters associated with a subscriber; and ii) a subscriber's database which stores subscriber definable programs, parameters and callers' related information, and which has a connection to said carrier's database, wherein said system comprises:

a) means for retrieving from said carrier's database said call handling instructions which direct said carrier's database to forward said call originating information to said subscriber's database via said connection;

b) means for sending said call originating information to said subscriber's database so that said subscriber's database can execute said subscriber definable programs to formulate a processing label in said subscriber's database as a logical function of the value of said call originating information and said caller's related information associated with said originating information;

c) means for receiving in said carrier's database via said connection, said processing label from said subscriber's database;

d) means for executing said call processing programs in said carrier's database using as input data said processing label information and said routing parameters to select a destination number for said call wherein said destination number conforms to characteristics denoted in said processing label; and e) means for forwarding said destination number and at least part of said processing label from said carrier's database to said originating switch in order to route said call to a subscriber's location using said communication switching system.

28. The invention defined in claim 27, wherein the subscriber definable programs include:

a) decision instructions which i) compare values of at least one of a plurality of stored fields in a record associated with a caller to predefined parameters and ii) derive action instructions from said comparison; and b) action instructions which specify i) input data to be evaluated in the execution of call processing programs in said carrier's database and ii) commands for specific functions to be performed by said carrier's database.

29. The system of claim 27, further including means in said carrier's database for instructing said originating switch to direct an attached call prompting device to solicit and collect information from said caller to supplement said originating information prior to forwarding said originating information to said subscriber's database.

30. The system of claim 27, further including:

means for determining in said subscriber's database if a record exists for said caller; and means for directing said carrier's database to instruct said originating switch to solicit and collect information from said caller upon a negative outcome of said determination.

31. The system of claim 27, wherein, said originating information passed by said carrier's database to said subscriber's database includes:

i) the Automatic Number Identification (ANI) of a calling station;

ii) a called number; and iii) caller entered information.

32. The system of claim 27, wherein said processing label includes at least one of the following fields:

i) a routing label which provides routing input data to said carrier's database;

ii) an end point label denoting characteristics associated with said call;

iii) a billing information label which contains data for creating a billing record for said call.

33. The system of claim 32 further including means for subscriber's premise equipment at said subscriber's location receiving said call to route said call to one of a plurality of attendant split positions as a function of the value of said end point label.

34. The system of claim 33 further including means in said subscriber's premise equipment for forwarding said end point label to display monitors.

35. The system of claim 33 further including means in said subscriber's premise equipment for forwarding said end point label to an attached processor in order to retrieve additional information about said call.

36. The system of claim 27 further including:

means for determining in said carrier's database the operational status of said subscriber's database; and means for invoking a default routing logic when said subscriber's database is disabled.

37. The system of claim 27 further including means in said carrier's database for temporarily disabling communications with said subscriber's database upon instructions from said subscriber.

38. The system of claim 32 further including means in said carrier's database for using said routing label to route said call to an audio response unit capable of emitting a plurality of announcements, and wherein one of said announcements is selected as a function of the value of said end point label.

39. The system of claim 32 further including means in said carrier's database for forwarding said billing information label to said originating switch for the purpose of creating a billing record for said call.

40. The system of claim 27, wherein, said destination number forwarding means in said carrier's database further includes means for sending said destination number to said subscriber's database after said call has been completed; and wherein said system further includes means for updating a file of call handling resources available at all subscriber's locations in accordance with said forwarded information.

41. The system of claim 40, wherein said updating means further includes means for updating said file of call handling resources in accordance with a preselected average call holding time

42. The system of claim 40, wherein said updating means further includes means for receiving in said carrier's database at call termination, a call termination message from said originating switch;

means for receiving in said subscriber's database said call termination message sent by said carrier's database; and means for updating said call handling resources file in said subscriber's database in accordance with said received information.

43. The method of claim 40 further including means for using records of said updated call handling resources file in said subscriber's database as input data in the formulation of said processing label.

44. The system of claim 32, further including means for using said routing label to associate said call to a specific class triggering the execution of specific routing tree instructions in said carrier definable programs in said carrier's database to determine a treatment for said call.

45. A system of routing a database-queried call initiated by a caller to a subscriber's premise equipment and forwarding to said subscriber's premise equipment information associated with said call, using the call processing capabilities of a communication switching system comprised of:

i) an originating switch which receives from the caller originating information associated with the call;

ii) a carrier'storage and processing facility storing carrier definable call processing programs, subscriber's related call processing information and routing parameters; and iii) a subscriber's storage and processing facility storing subscriber definable programs and callers' related information, wherein said system comprises:

a) means for retrieving in said carrier's storage and processing facility initial call handling instructions based on said subscriber's related call processing information;

b) means for forwarding to said subscriber's storage and processing facility said originating information associated with said call so that said subscriber's storage and processing facility can execute said subscriber definable programs to formulate a processing label identifying with a code a plurality of stations with specific characteristics associated with said call at any of a plurality of locations;

c) means for receiving said processing label in said carrier's storage and processing facility and devising a destination number for said call in said carrier's storage and processing facility using at least part of said processing label and said carrier's storage and processing facility routing parameters;

e) means for forwarding said destination number and part of said processing label to said originating switch;

f) means for routing said call to said subscriber's premise equipment using said communication switching system; and g) means for forwarding part of said processing label to said subscriber's premise equipment for the purpose of directing said call to one of a plurality of specific stations connected to said premise equipment.

46. The method of claim 19 wherein said said updating step further includes the step of:

updating said file of call handling resources in accordance with a preselected average call holding time.

* * * * *